(12) United States Patent
Schelling et al.

(10) Patent No.: US 12,234,048 B2
(45) Date of Patent: Feb. 25, 2025

(54) SYSTEM AND METHOD FOR AUTOMATED GENERATION OF MOTION AND POSITION PARAMETERS OF A PACKAGING OR PALLETIZING MACHINE FOR BUNDLE ARRANGEMENTS

(71) Applicant: KRONES AG, Neutraubling (DE)

(72) Inventors: Felix Schelling, Bruckmuehl (DE); Tolga Kuscular, Rosenheim (DE); Manuel Kollmuss, Raubling (DE); Markus Stockbauer, Raubling (DE); Arsalan Mehdi, Rosenheim (PK); Erhard Beer, Ebbs (AT)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 18/003,876

(22) PCT Filed: May 31, 2022

(86) PCT No.: PCT/EP2022/064679
§ 371 (c)(1),
(2) Date: Dec. 29, 2022

(87) PCT Pub. No.: WO2023/011778
PCT Pub. Date: Feb. 9, 2023

(65) Prior Publication Data
US 2024/0294292 A1 Sep. 5, 2024

(30) Foreign Application Priority Data

Aug. 4, 2021 (DE) .......................... 102021120324.4

(51) Int. Cl.
*B65B 57/10* (2006.01)
*B65B 21/00* (2006.01)
*B65B 35/44* (2006.01)

(52) U.S. Cl.
CPC .............. *B65B 57/10* (2013.01); *B65B 21/00* (2013.01); *B65B 35/44* (2013.01)

(58) Field of Classification Search
CPC .......... B65B 57/10; B65B 21/00; B65B 35/44
See application file for complete search history.

(56) References Cited

U.S. PATENT DOCUMENTS 4,847,761 A * 7/1989 Ferriter ................ G06Q 10/087
705/29
6,055,462 A * 4/2000 Sato ....................... B25J 9/1687
700/217
(Continued)

FOREIGN PATENT DOCUMENTS

DE 102006003859 B3 3/2007
DE 102016103117 A1 8/2017
(Continued)

*Primary Examiner* — Hemant Desai
*Assistant Examiner* — Mobeen Ahmed
(74) *Attorney, Agent, or Firm* — McCoy Russell LLP

(57) ABSTRACT

The invention relates to a packaging or palletizing machine, a system and a method for automated generation of motion and position parameters for a packaging or palletizing machine for bundle arrangements. Layer and/or packaging parameters can be entered at a user interface that is used to generate parameters for controlling the packaging or palletizing machine. A digital twin of the packaging or palletizing machine can be used to generate or calculate the parameters. This allows the calculated parameters to be tested and validated by simulation using the digital twin. The parameters are generated such that the packaging machine being controlled using the parameters creates a package for a bundle according to the packaging and/or layer parameters and/or the palletizing machine being controlled using the parameters arranges bundles according to the layer and/or (Continued)

packaging parameters. After generating the parameters, the packaging or palletizing machine is configured based on the calculated parameters.

13 Claims, 7 Drawing Sheets

(56) References Cited

U.S. PATENT DOCUMENTS

| | | | | |
|---|---|---|---|---|
| 2003/0158795 A1* | 8/2003 | Markham | ............... | G06Q 10/10 705/28 |
| 2007/0063844 A1* | 3/2007 | Jenney | ................... | G08B 13/24 340/572.1 |
| 2015/0331435 A1* | 11/2015 | Mac | ....................... | G05B 15/02 700/298 |
| 2017/0351244 A1* | 12/2017 | Wolf | ................. | G05B 19/4063 |
| 2020/0265329 A1* | 8/2020 | Thomsen | ................ | G06N 20/10 |
| 2021/0081840 A1* | 3/2021 | Darmour | ................. | G06F 18/22 |
| 2022/0288787 A1* | 9/2022 | Dupree | .............. | G05B 19/4182 |
| 2022/0297958 A1* | 9/2022 | Moreno | ................. | B25J 9/1664 |
| 2022/0331989 A1* | 10/2022 | Moreno | ............... | B25J 15/0616 |
| 2022/0339800 A1* | 10/2022 | Poteet | ................... | B25B 11/005 |
| 2023/0321835 A1* | 10/2023 | Mao | ........................ | B25J 9/1697 700/254 |
| 2023/0331498 A1* | 10/2023 | Hau | ........................ | B65G 61/00 |
| 2023/0415943 A1* | 12/2023 | Marseglia | ................. | B65B 5/06 |
| 2024/0149462 A1* | 5/2024 | Holmberg | .............. | B25J 9/1664 |

FOREIGN PATENT DOCUMENTS

| | | |
|---|---|---|
| DE | 102019101852 A1 | 7/2020 |
| DE | 102019126947 A1 | 4/2021 |
| DE | 102020106527 A1 | 9/2021 |
| KR | 20190017133 A | 2/2019 |
| WO | 2012126130 A1 | 9/2012 |

* cited by examiner

SYSTEM AND METHOD FOR AUTOMATED GENERATION OF MOTION AND POSITION PARAMETERS OF A PACKAGING OR PALLETIZING MACHINE FOR BUNDLE ARRANGEMENTS

CROSS REFERENCE TO RELATED APPLICATIONS

The present application is a U.S. National Phase of International Application No. PCT/EP2022/064679 entitled "SYSTEM AND METHOD FOR AUTOMATED GENERATION OF MOTION AND POSITION PARAMETERS OF A PACKAGING OR PALLETIZING MACHINE FOR BUNDLE ARRANGEMENTS," and filed on May 31, 2022. International Application No. PCT/EP2022/064679 claims priority to German Patent Application No. 102021120324.4 filed on Aug. 4, 2021. The entire contents of each of the above-listed applications are hereby incorporated by reference for all purposes.

TECHNICAL FIELD

The invention relates to a system, a device and a method for automatically generating parameters for grouping containers, in particular containers of a beverage container stream into a bundle arrangement and for arranging bundle arrangements according to the independent claims.

BACKGROUND AND SUMMARY

Usually, the containers of a beverage container stream are pre-arranged in lanes and fed to a packaging machine in order to pack them as bundles. The containers can be, for example, beverage containers or the like, which are transported directly one after the other in one or more lanes as a serial container stream and are processed by the packaging machine in such a pre-arranged manner. For this purpose, the containers of the beverage container stream are usually transported upright by a linear conveyor and distributed to the aisles by guide elements in such a way that they are each present therein as a serial container stream.

In order to support a faultless partitioning of the containers, joggers or vibrators are usually additionally used to prevent jamming of the containers in the crowding area of the guide elements. The containers of the beverage container streams are then rearranged to form a bundle arrangement which is then fed to a packaging machine. For example, the containers rearranged as a bundle arrangement can be linked to the packaging machine, for example with carton packs or as shrink packs.

By bundle arrangement may be meant a group of regularly arranged containers. For example, grid arrangement of a 6-pack of 2×3 containers may be meant. Likewise, grid arrangements of 2×4, 3×3, 3×4, 3×5, 4×4, 4×5, 4×6 or still other regular grid arrangements, such as a hexagonal grid arrangement, are also conceivable.

Usually, the bundles are grouped according to predefined layer structures. This layer structure or bundle arrangement can be stored in a control unit as a layout. The layout is a digital data record, which is created in the control unit or by means of a separate computer and is to be adapted according to the container types as well as the desired bundle arrangement, as well as the required bundle or pallet size or if necessary even a whole layer scheme.

In particular, such a grouping of containers of a container stream can be carried out with one or a formation of robots, which are controlled by the control unit on the basis of the stored layout in such a way that the containers in the grouping area are rearranged with the robots to the required bundle arrangement. Form-fitting precision grippers can bring the bundles safely and precisely to their intended position.

On the one hand, such a modularly designed system with control of the individual system elements, including the robots or robotics for grouping and rearranging the containers or the bundles according to a required or stored bundle arrangement, enables a high grouping performance with short infeed distances between the packing and palletizing system with up to several hundred layers per hour. On the other hand, the generation of the required parameters of the system modules and the robots is very complex, in particular due to the large number of possibilities of desired position and/or packaging parameters, such as different bundle sizes, different pallet sizes, different layer schemes of the containers within a bundle, the container sizes, the container cross sections or combinations of different types of containers to form a bundle.

Typically, these parameters are manually assembled by an experienced operator for each operator module of individually defined parameter defaults. In doing so, the operator must observe certain operating limits with regard to maximum force, torque, axis moment and other load limits in order to avoid generating motion sequences of the loaded and unloaded robotics when setting the parameters, whose accelerations and resulting forces and moments are above the system limits. If, for example, due to incorrectly set parameters, too high a mass loading and/or too high an acceleration of a robot arm is carried out, this can damage the system.

Mutual collisions of several movable machine components and robot arms must also be prevented, which is a high challenge at high speeds and the dynamics involved.

To systematically prevent such damage, power reserves are built into the system which are not utilized during normal operation. In this context, a so-called "2-second rule" has become established, which sets a pause of 2 seconds on the system side after a robot cycle in order to avoid unintentionally high acceleration values and to prevent possible collisions. While these established measures provide system-side protection, they also reduce the efficiency of the system.

Therefore, there is a need for improved packaging and/or palletizing machines and improved methods for configuring packaging and/or palletizing machines.

According to the invention, this task is solved by a method for automated generation of motion and position parameters of a packaging or palletizing machine for bundle arrangements according to claim 1, a packaging or palletizing machine for bundle arrangements according to independent packaging or palletizing machine claim and a system according to independent system claim. Further embodiments are defined in the dependent claims.

One embodiment of the invention relates to a method for automated generation of motion and position parameters of a packaging or palletizing machine for bundle arrangements. The method comprises receiving layer and/or pack parameters at a user interface. The user interface may be accessed using, for example, an HMI, computer, laptop, smartphone, tablet, or the like. The received layer and/or packaging parameters may then be transmitted to a server. Alternatively, the parameters may be kept locally and processed in the machine, for example. The method further comprises generating parameters for controlling the packaging or palletizing machine. In particular, a digital twin of the packaging or palletizing machine can be used to generate or calculate the parameters. This allows the calculated parameters to be tested and validated by simulation using the digital twin. The parameters are generated such that the packaging machine being controlled using the parameters creates a package for a bundle according to the packaging and/or layer parameters, or the palletizing machine being controlled using the parameters arranges bundles according to the layer and/or packaging parameters. The layer parameters and the packaging parameters do not necessarily have to be considered separately. It is also possible that the palletizing machine in particular takes the packaging parameters into account in its operation, or that the packaging parameters are taken into account when configuring the palletizing machine. Similarly, it is also possible that the layer parameters for the palletizing machine have an influence in the configuration or operation of the packaging machine. Packaging parameters can be parameters for creating a package, such as glue application length, film tunnel temperature depending on film thickness, etc.

For example, after the calculation of the parameters is completed, a data set is received from the server. The data set comprises the generated parameters for controlling the packaging or palletizing machine. Once the parameters are available, the packaging or palletizing machine is configured based on the received data set.

As an alternative to calculating (generating) the parameters using a digital twin, the parameters may be calculated, for example, by simulation using a similar device.

According to an exemplary embodiment, the parameters may be calculated and generated using an Artificial Intelligence. Calculating the parameters using artificial intelligence may comprise minimizing unused power reserves of the movement of moving components of the packaging or palletizing machine. The calculation using artificial intelligence may comprise a validation of the feasibility of the parameters using the digital twin of the packaging or palletizing machine.

One embodiment of the invention relates to a packaging or palletizing machine for creating and/or arranging bundles. A further embodiment of the invention relates to a system comprising a packaging or palletizing machine for bundle arrangements and a server for calculating parameters for the packaging or palletizing machine.

BRIEF DESCRIPTION OF THE FIGURES

Exemplary aspects of the invention are shown in the drawings. They show.

DETAILED DESCRIPTION

The configuration of packaging or palletizing machines is technically demanding, since a large number of parameters must be set, some of which are also interdependent. This means that if one parameter is set correctly, for example for a first cycle of a first robot arm, changing another parameter, for example for a robot arm in the same cycle, can have a disadvantageous effect on the already supposedly correctly set parameter and change it unfavorably again. To prevent such cross-effects and thus high acceleration values of robot arms, a lot of experience in the field of packaging or palletizing machines is usually required.

Figure 1A:
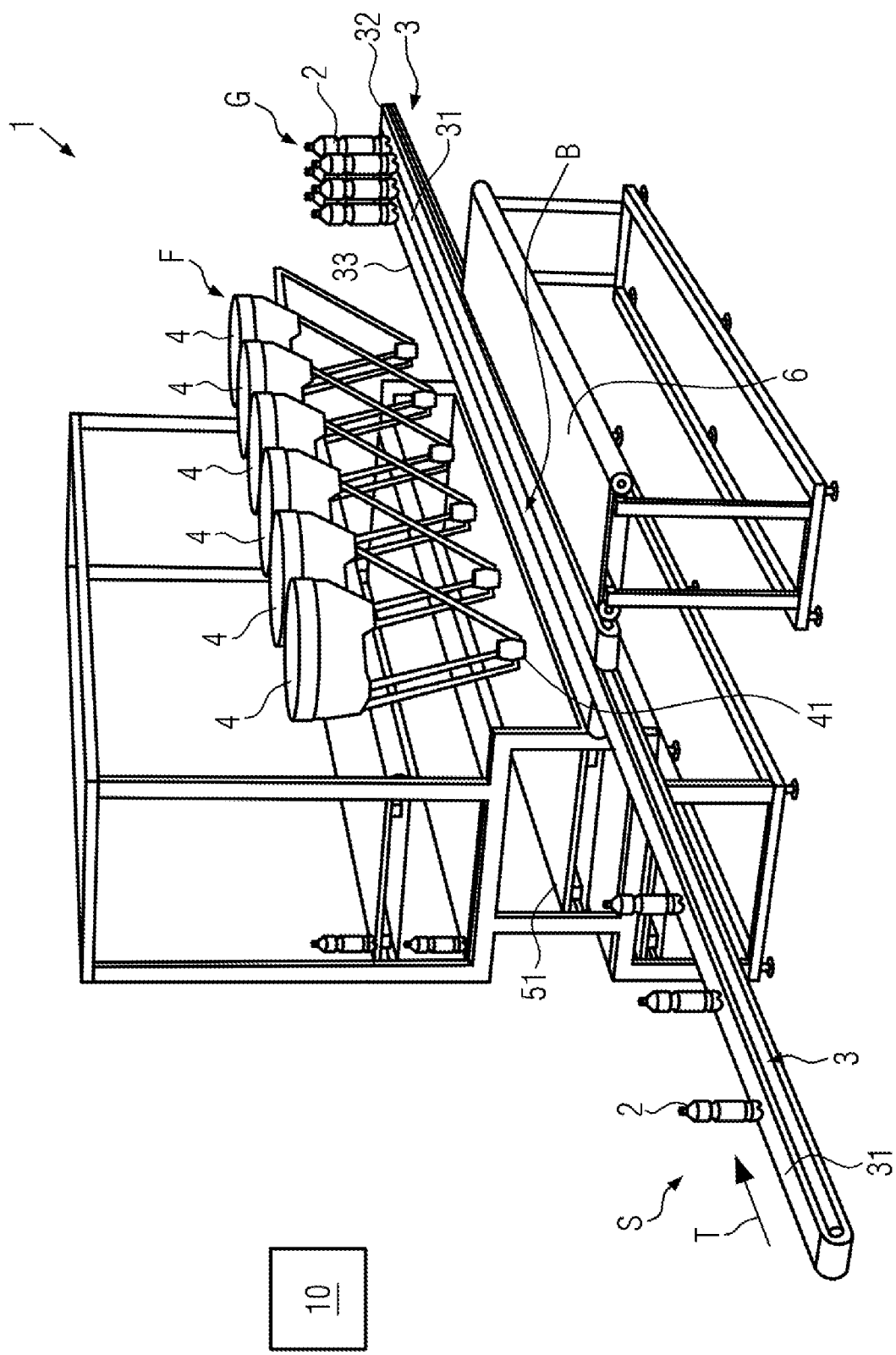
FIG. 1a: a perspective view of an embodiment of a device according to the invention for grouping a beverage container stream into a bundle arrangement.
Figure 1B:
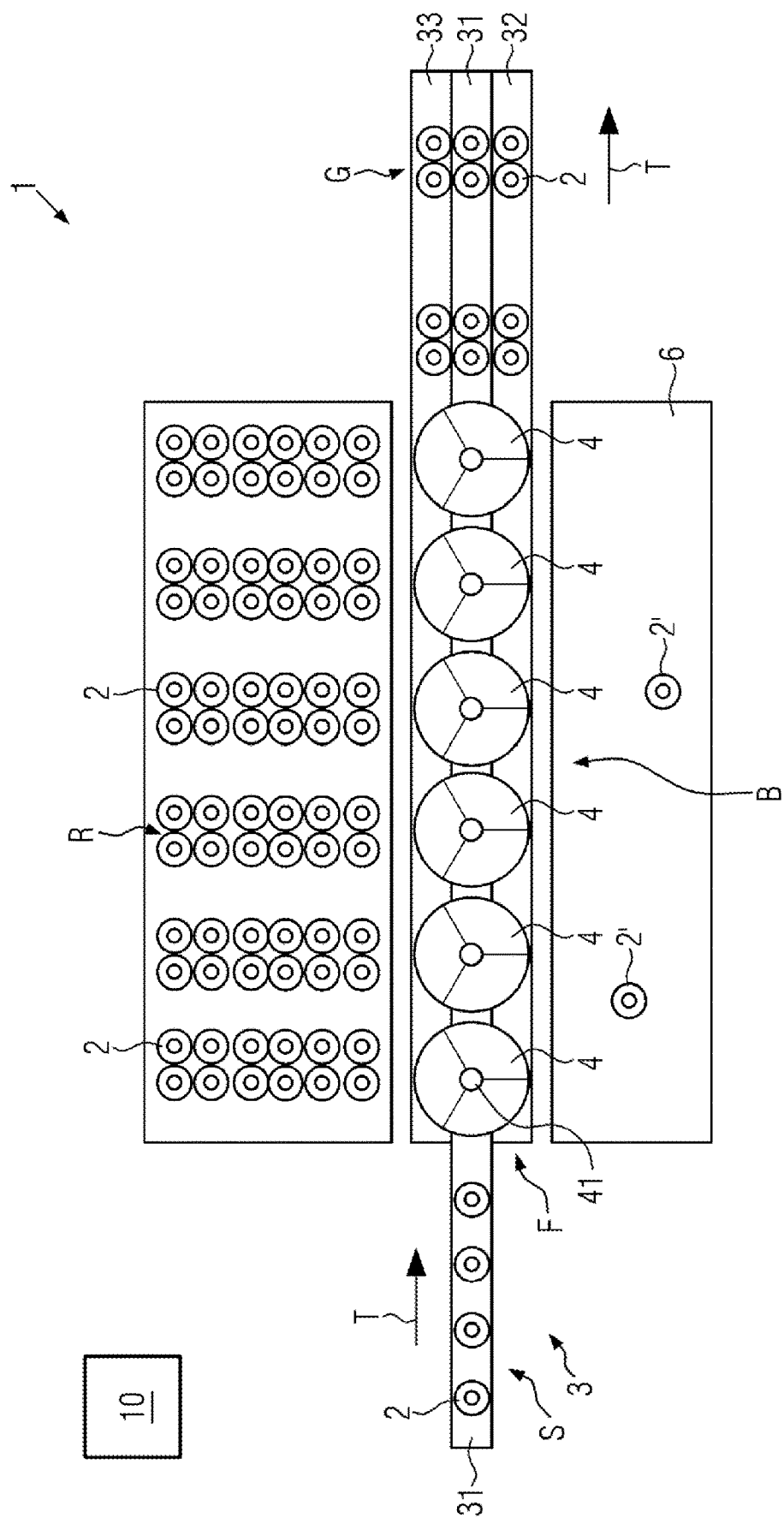
FIG. 1b: a top view of a device according to the invention for grouping a beverage container stream into a bundle arrangement.

FIGS. 1a-1b show a perspective view and a top view of an embodiment of a device 1 according to the invention for grouping a beverage container stream S into a bundle arrangement G. The device 1 represents an example of a packaging machine with which, for example, a plurality of containers can be arranged to form a bundle and/or a plurality of containers can be packaged in a box or a tray.

Although FIGS. 1a and 1b show an example of a device 1 for arranging individual containers or bottles into a bundle of multiple bottles, such as a 6-pack of 2×3 containers, the invention is not limited to creating bundles. More particularly, the invention also relates to arranging individual bundles on a pallet. In this regard, the process of arranging the bundles on a pallet is analogous and similar to the process of arranging individual containers into a bundle or into a box/tray itself. A special feature of the arrangement of bundles on a pallet is that, due to the larger masses of bundles, higher forces can act and that there can be several layout options and more parameters to be taken into account when programming the robot sequences.

Figure 2A:
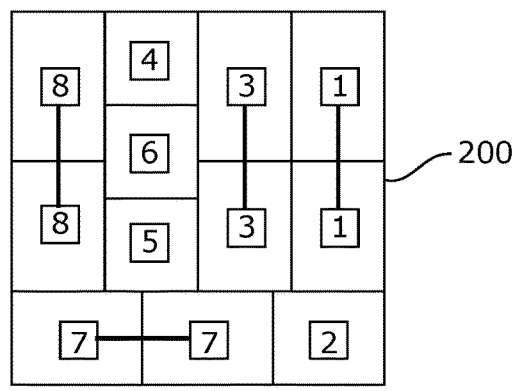
FIG. 2a: An exemplary palletizing layout of bundles as they are to be arranged on a pallet.
Figure 2B:
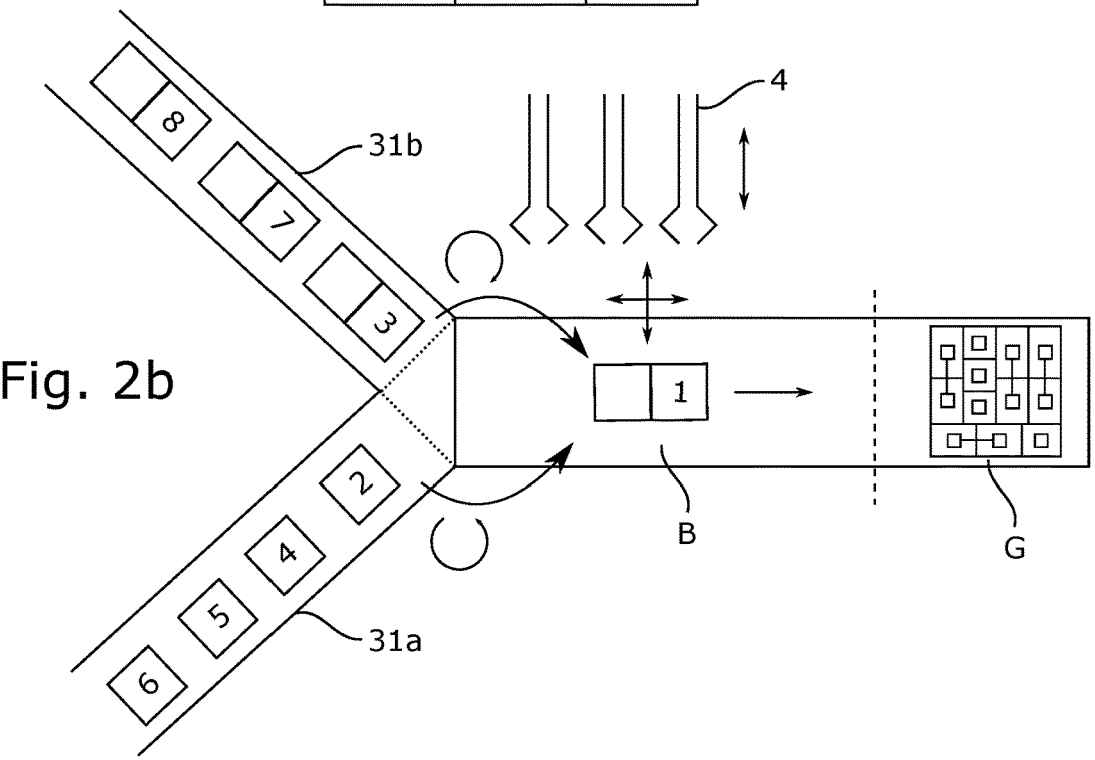
FIG. 2b: An example embodiment of a packing and palletizing machine according to the invention.
Figure 2C:
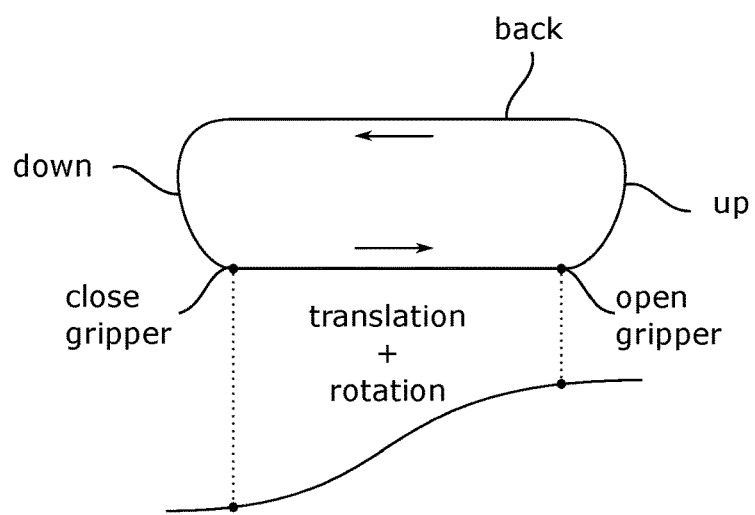
FIG. 2c: an embodiment example according to the invention of a robot arm track of a packing and palletizing machine.

Therefore, although the following description of FIGS. 1a and 1b relates to arranging individual containers into a bundle for case of understanding, the invention is not limited thereto and the same features of FIGS. 1a and 1b are also valid for arranging bundles on pallets, as further described in FIGS. 2a-2c.

A layout of the bundle specified by the user, i.e. the arrangement of articles 2, such as bottles, cans, containers, etc., or even the arrangement of entire bundles, is implemented by the robots 4. In this case, a control unit controls the formation with the robots 4 on the basis of the stored layout in such a way that the articles 2 are rearranged in the grouping area with the robots in order to form the bundle arrangement. It is conceivable, for example, that the formation with the robots is arranged along the linear conveyor and the articles 2 are rearranged on the linear conveyor to form the bundle arrangement. Subsequently, the articles can be transported to a subsequent conveyor and/or packaging machine.

When packing or arranging bundles on a pallet, a palletizing machine can be used that operates according to a parallel principle to the device of FIGS. 1a and 1b, as will be described below.

During rearrangement, the articles can, for example, each be picked up by the robots and set down at a different position in the grouping area. It is conceivable that they are set down again on the linear conveyor in the process. It is likewise conceivable that the articles are merely moved by the robots.

For example, the robots can be arranged one after the other along the linear conveyor, as shown for example in FIGS. 1a-1b.

Although the device 1 shows a packaging machine, it can also be a palletizing machine for bundle arrangements. In this case, it is not individual containers that are transported and arranged on the linear conveyor, but rather bundles of multiple containers that have already been packed. However, the concepts of the invention as described herein are not intended to be limited to the grouping of beverage container bundles and other items may also be packed in bundles or individually and/or arranged on a pallet, such as boxes or trays.

To be seen in FIG. 1 is the linear conveyor 3 with three parallel conveyor belts 31-33, wherein the conveyor belt 31 is provided to transport the beverage container stream S (or one or more streams of bundles) in the direction of transport T to the grouping area B. For example, the linear conveyor 3 includes at least one controllable drive to drive the conveyor belts 31-33. It is conceivable that they are driven together with one drive or separately from each other with separately controllable drives. The central conveyor belt 31 is provided to transport the serial flow of articles in the infeed to the grouping area B. In order to transport the wider bundle arrangement G during and after rearrangement, the lateral conveyor belts 32 and 33 can also be provided.

At the grouping area B, the formation F with robots 4 is arranged to rearrange the articles 2 (containers, bottles, bundles, etc.) to form the bundle arrangement G, in this example a 6-pack with 2×3 containers. In this case, the formation F with robots 4 is controlled on the basis of a layout stored in the control unit 10 so that the articles 2 are rearranged in the grouping area B with the robots 4 to form the bundle arrangement G. In the case of a palletizing machine, bundles that have already been arranged as articles 2 are rearranged in the grouping area B with the robots 4 so that they are arranged on a pallet according to a predefined layout.

The robots 4 here are, for example, of the robot type a delta robot, since this allows the containers 2 to be moved particularly quickly transversely to the transport direction T on the linear conveyor 3. For this purpose, the robots 4 each include a container manipulator 41, for example in order to grip the containers 2 at the container neck during transport, lift them up and set them down again at another point on the linear conveyor 3. However, it is also conceivable that the containers 2 are moved with the container manipulator 41 during transport. It is conceivable that different product types of the containers are detected and sorted in the process. For example, as described previously, different flavors can be assembled as samples in the bundle arrangement G.

Particularly for palletizing machines, the robots 4 can be, for example, of the robot type a tripod robot with a parallel-kinematic structure. This means that all axes can operate simultaneously and the drives can be mounted fixed to the frame so that they do not have to be moved along. This allows bundles to be grouped according to a specified layer pattern or layout, and high grouping performance can be achieved with just one module. The tripod robots can be equipped with positive and/or non-positive grippers, in particular precision grippers, which bring the bundles safely and precisely to their intended position. The bundles can run continuously into the grouping area B and are stressed as little as possible if the control of the robotics is optimized accordingly. The grouping system can also independently check the position of the incoming bundles and readjust them in the event of deviations.

Furthermore, in FIGS. 1a and 1b, a control unit 10 can be seen, which is formed here, for example, with a microprocessor, a memory unit, a display unit, an input unit, a network interface, and/or with a control interface. The control interface may be provided to control the linear conveyor 3, the formation with robots 4, a buffer system and/or a parking section 6. Further, the control unit 10 may also be adapted for setting the parameters of the machine as described herein.

FIGS. 2a to 2c show further details of the planning and implementation of the grouping of different bundles, as can be carried out with the system of FIGS. 1a and 1b. In this regard, FIGS. 2a-2c show the arrangement of bundles on a palletizing machine.

FIG. 2a shows an exemplary layer pattern as planned by an operator of the machine. The layer pattern includes a layout 200 that includes an arrangement of various bundles. For example, in FIG. 2a, two different types of packs are shown to be sorted together on a pallet. A first bundle is shown as a single quadrilateral in FIG. 2a, and a second bundle is shown in the figure as two quadrilaterals connected by a line. For example, the second bundle may already consist of a group of two bundles and therefore takes up more space than the first bundle, or the second bundle is a larger bundle of larger items than the first bundle type The layout 200 is specified by an operator and generally must be manually translated into the motion control of the robotics 4. For example, an operator with appropriate experience can program the motion sequences of the individual robot arms 4 in the form of repetitive motion cycles, taking into account the systematic framework conditions such as maximum axis torques, forces, acceleration and mutual collision avoidance.

When planning the packing, packaging and/or arrangement of the bundles on a pallet, an operator must also take into account the order of the bundles to be gripped and arranged on the pallet, especially in the case where different types of bundles are to be arranged together. As exemplarily shown in FIG. 2a, the individual bundles in the layout 200 for a layer are marked with the numbers 1 to 8, which shows the order of arrangement from the conveyor belts on the pallet. The layout 200 is thereby for a single layer on a pallet and the layout of a next layer above it may be different from the layer; for example, it may be mirror-inverted to increase the stability of the palletizing.

As can be seen in FIG. 2a, a large (double) bundle is marked with a "1" at the right edge of the layout 200 and is therefore to be taken from the conveyor first and arranged on the pallet according to the layout 200. After that, a smaller bundle (marked with a "2") is to be taken and arranged and so on. Usually, such layouts and robot controls are created in special calculation tools, and a technician has to program and calculate the matching motion sequences of the robot arms 4.

The user inputs into such a computational tool therefore require a very profound knowledge of the dynamics of the partially non-computable system. In addition, the operation of such software is difficult when not used on a daily basis due to its high complexity. As a result, rapid problem elimination is often not readily possible in the event of errors or incorrectly set machines.

An example of a palletizing machine is shown in FIG. 2b. As shown in FIG. 2, two conveyor belts 31a and 31b can be used to transport the two different types of the bundles. However, this geometry is only exemplary and there may be more than one conveyor belt, or the different bundles may be conveyed to the arrangement area on a single conveyor belt. The bundles on the conveyor belts 31 are gripped by one or more robots 4 and arranged on a pallet according to the layout and programmed motion sequences. Due to manual programming and compliance with certain power reserves, this process is not always an optimal movement sequence.

According to the layout 200, the movement of the robots 4 must be previously translated by an operator and programmed into the controller of the robots 4. An exemplary sequence of a robot arm 4 is shown in FIG. 2c, in which a motion path including subsections for one cycle is shown. This path must be set by the operator according to the layout 200. It should be noted at this point that the motion paths and trajectories as shown here are highly simplified and in reality look much more complex and include higher dynamics.

This means that the schemes shown in FIGS. 2a to 2c are highly simplified and a lot of further parameters have to be considered and set in the machine controller.

Possible movements of the robot arm here include lowering the robot arm 4, gripping, rotating and/or moving the gripped bundle, releasing the bundle, raising the robot arm 4 and returning to the initial state. These paths must always be programmed without collisions, which involves a significant additional effort and an increase in complexity.

As described at the beginning, there is a risk of incorrect setting of the robotics by manual setting of the path or programming. For example, in order to prevent excessive acceleration values of the robot arms, performance reserves are given which must not or cannot be bypassed. One possible performance reserve relates, for example, to the 2-second rule, which, after a first movement of a robot arm, prevents the robot arm from being steered to another position again within 2 seconds. This prevents large acceleration values, high axis torques and increased force effects that can occur if two widely separated position specifications are accidentally actuated at directly successive times.

On the other hand, such a power reserve also prevents an optimized time sequence and thus reduces the efficiency of the overall system, which allows a lower number of packing and/or palletizing processes.

Due to the large number of possible input parameters, it is not possible to get the optimum out of a machine purely by expert knowledge. This means that not all performance reserves can be used accordingly. The dependencies are so complex that they cannot be compensated for and represented purely by statistical evaluations. The robotics used are therefore often not used in the best possible way.

According to exemplary aspects of the invention, an automated computational model is provided that is capable of generating an optimized and validated parameter data set for the machine from simple, understandable input parameters. In doing so, this data set can be validated using trained algorithms in conjunction with a digital image of the machine and then implemented in the machine's control system. Thus, a performance and resource optimized validated parameter set for the packaging or palletizing machine can be obtained without requiring expert knowledge.

According to exemplary aspects, the generation of the optimized parameters for the packaging or palletizing machine may be created by an artificial intelligence module, or AI module. An exemplary scheme of the calculation by the AI module is shown in FIG. 3.

Figure 3:
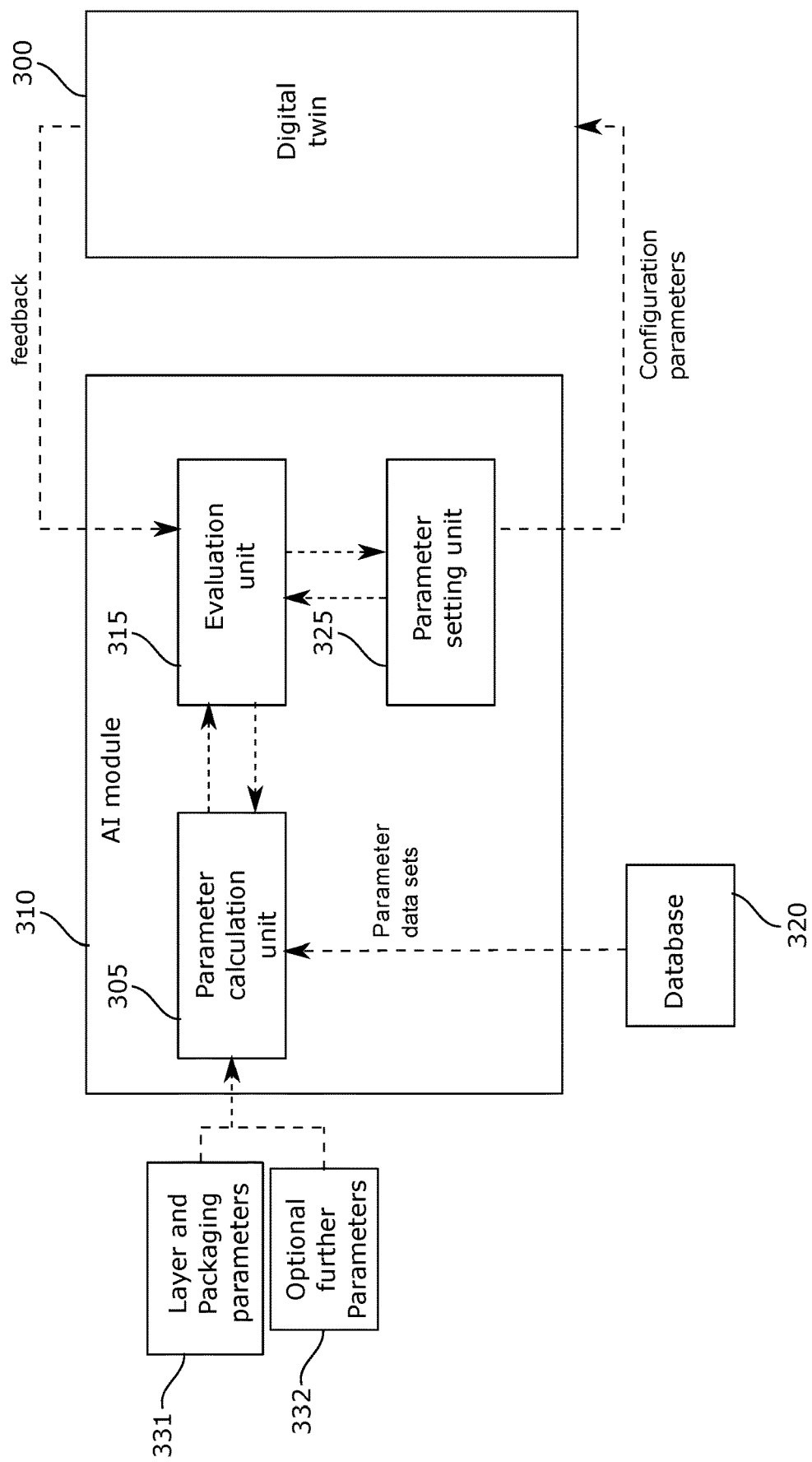
FIG. 3: an embodiment example according to the invention of an AI module for calculating the optimized operating parameters of a packaging or palletizing machine.

As shown in FIG. 3, according to the invention, the AI module 310 communicates with a digital twin 300 of a packaging or palletizing machine. The digital twin may be for the packaging machine only, may be for the palletizing machine only, but may also be a digital twin of the overall system of packaging or palletizing machine.

The AI module 310 may be implemented on a remote server and may be designed to configure multiple different packaging or palletizing machines. In this case, it is possible for the AI module 310 to have access to data sets for a large number of different modules for different packaging or palletizing machines and for these data sets to be more easily expanded.

The AI module 310 receives or uses various data sets and uses the input data to create configuration parameters for the packaging or palletizing machines. The input data is primarily layer and packing parameters 331 that are entered by the user via a user interface. Other optional parameters 332 may include, for example, machine characteristics or further technical parameters. The parameters entered include, for example, a pallet type, a pallet size, a packing scheme, a layer pattern, arrangement of bundles on a pallet, a packing item description, a bundle size, a storage scheme, and/or a tray or carton size.

Further parameters that may be input to the AI module 310 include, for example, hardware parameters of the packaging or palletizing machine that include a machine feature and/or one or more setup parts, and bills of materials relating to bundles.

The above parameters, which may be entered via a user interface, for example, may also be detected at least in part by sensors in the equipment itself, such as type parameters.

The AI module 310 may include a parameter calculation unit 305, an evaluation unit 315, and a parameter setting unit 325.

In addition to parameters 331 and 332, AI module 310 may use parameter records from a database 320 as a further type of input data. The parameter data sets in the database 320 are data sets that include configuration parameters of previously configured packaging or palletizing machines and bundle arrangement layouts, and may be used to create the new configuration parameters.

The AI module 310 combines and uses the various input data to generate a set of configuration parameters that configures the packaging or palletizing machine according to the specifications of the layout 200 and/or the user.

According to exemplary aspects, the parameter calculation unit 305 receives the input data 331 and 332 as described above in FIG. 1 and calculates automated sequences of the robotic arms and other modules of the packaging or palletizing machine. This initial calculation of the parameters in the parameter calculation unit 305 is not yet a validated and optimized parameter data set, but a starting point for the optimization process.

The initially calculated parameters of the parameter calculation unit 305 may be passed to the evaluation unit 315 in a further step. The evaluation unit 315 can analyze the data from the parameter calculation unit 305 and determine whether the configuration settings initially determined by the simulation unit produce usable results. By returning or feeding back the analysis from the evaluation unit 315 to the parameter calculation unit 305, the configuration parameters are optimized and created.

The parameterization model generated in the parameter calculation unit 305, i.e., the configuration parameters of the packaging or palletizing machine, can then be validated and optimized in the interaction between the parameter calculation unit 305 and the evaluation unit 315.

The evaluation unit 315 transfers the parameters to a parameter setting unit 325, which implements the calculated parameters in a digital twin 300 of the packaging or palletizing machine. The digital twin 300 can be a virtualization of the machine in a simulation environment. The digital twin 300 simulates the set parameters of the packaging or palletizing machine in one or more operation sequences and feeds the simulation result back to the evaluation unit 315.

The evaluation unit 315 evaluates the corresponding simulation results and passes the evaluation to the parameter calculation unit 305. In turn, the parameter calculation unit 305 may recalculate, modify, optimize, and/or adjust the calculated parameters according to the evaluation, if necessary, and feed them back into the artificial intelligence circuit.

According to the invention, the digital twin 300 is used to generate simulation data for possible operating faults. This simulation data of the digital twin 300 corresponds one-to-one to the operating data of the real packaging or palletizing machine when it is configured and operated with the calculated parameters.

Through multiple runs, the learning effect of the AI module 310 intensifies and the configuration parameters generated by artificial intelligence can optimize the configuration of the packaging or palletizing machine within a short period of time in a way that would not be possible purely through expert knowledge. Once the evaluation unit 315 determines that the evaluation results of the configuration parameters are sufficient, the data is given to the packaging and palletizing machine.

The parameter calculation may be performed on a server, for example. The artificial intelligence parameter calculation may include minimizing unused power reserves of the movement of moving components of the packaging or palletizing machine.

The data computed in the AI module 310 need not necessarily include only configuration parameters for the packaging or palletizing machine, but may also include, for example, instructions for a user to take action. For example, the AI module 310 may recognize that a modification, rebuild, or expansion of the packing or palletizing machine will allow for more efficient operation. These instructions and directions for a modification may be provided in written and/or pictorial form and may be provided with the parameters.

However, the exemplary AI processes described herein, and in particular the processes as described in connection with FIG. 3, are not intended to be limiting. Other AI concepts may also be used, such as deep learning or machine learning methods and other methods based on training models.

In the packaging or palletizing machine, the configuration parameters are applied to configure the individual modules and robots. Preferably, the output parameter sets may comprise acceleration data. However, the parameters may also include position data, sequences, and/or axis torques of at least one layer forming robot in the packaging or palletizing machine. According to exemplary aspects, the parameter data set may be checked for completeness and/or integrity before the parameters of the data set are used to configure the packaging or palletizing machine. This may be performed, for example, in a control module 10 of the packaging or palletizing machine. A way to verify the integrity of the parameters can be implemented by applying a hash function.

Due to the optimized calculation by means of AI module 310, the so-called 2-second rule can be dispensed with and the power reserves can be reduced, or better utilized. By the AI also non-deterministic processes and effects can be handled optimized, which were computable before only with difficulty or not at all with the conventional method.

Figure 4:
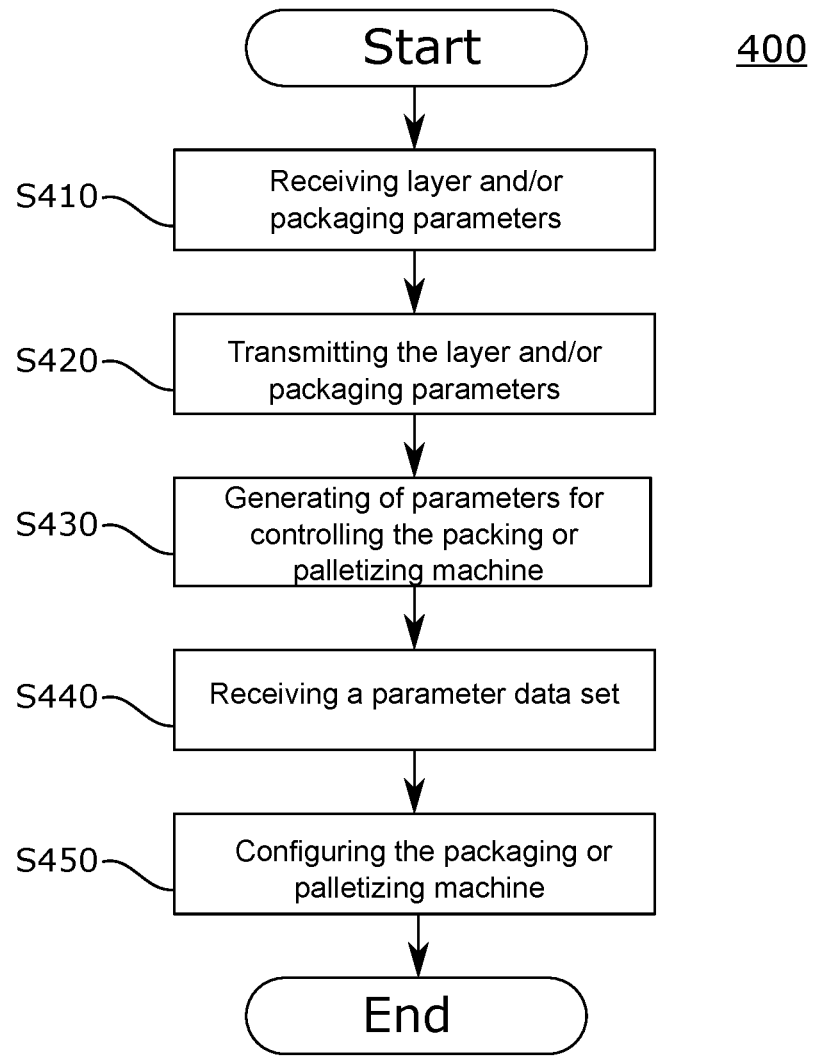
FIG. 4: an embodiment according to the invention of a method for automated generation of motion and position parameters of a packaging or palletizing machine for bundle arrangements.

FIG. 4 shows a method 400 for automated generation of motion and position parameters of a packaging or palletizing machine for creating and/or arranging bundles. For example, the method may be completely implemented in a packaging or palletizing machine, or all or some steps of the method may be implemented outside the packaging or palletizing machine, such as on a central server.

For example, the method 400 may be executed at the time of initial start-up after delivery and assembly of the packaging or palletizing machine. Additionally or alternatively, however, the method may be used periodically during operation as individual parameters change, such as pallet size, bundle arrangement, bundle layout, pallet layout, article, etc.

It is also possible to retrofit existing packaging or palletizing machines that have already been manually configured. In this way, even machines that have already been optimized can gain even more efficiency.

Additionally, the method may be performed after a machine error, such as collisions. In this regard, automated records of collisions and/or other errors may be automatically transmitted to the AI module 310 as well and may help identify and work around the causes of the errors or collisions.

In step S410, a user interface receives layer and/or packaging parameters that may be entered, for example, by a user. Input of these parameters is made simple and intuitive via the user interface, and does not require any particular prior technical knowledge of the equipment or mechanics in such packaging or palletizing machines. The parameters may include at least a pallet type, a pallet size, a packing scheme, a layer pattern, an arrangement of bundles on a pallet a packing item description, a bundle size, a storage scheme, and/or a tray or carton size. In the course of this, the system can also query further hardware parameters of the packaging or palletizing machine. This can be done automatically in the background or by input from a user. The hardware parameters can include, for example, a machine specification and/or one or more setup parts, and/or parts lists relating to bundles.

In step S420, the layer and/or packaging parameters can be transmitted to a server. This step can be considered optional if the calculation of the parameters does not take place on a server, but in the packaging or palletizing machine itself.

In the following step S430, the parameters for controlling the packaging or palletizing machine are calculated. This calculation may be performed according to the scheme of FIG. 3 and may take place either on the server or in the machine itself. The generation of the parameters can include a calculation of the parameters using a digital twin of the packaging or palletizing machine. The parameters are generated such that the packaging machine controlled by the parameters creates a package for a bundle according to the packaging and/or layer parameters, or the palletizing machine controlled by the parameters arranges bundles according to the layer and/or packaging parameters. The layer parameters and the packaging parameters do not necessarily have to be considered separately. It is also possible that the palletizing machine in particular takes the packaging parameters into account in its operation, or that the packaging parameters are taken into account when configuring the palletizing machine. Similarly, it is also possible that the layer parameters for the palletizing machine have an influence in the configuration or operation of the packaging machine. Packaging parameters can be parameters for creating a package, such as glue application length, film tunnel temperature depending on film thickness, etc.

The parameters may be calculated and generated using artificial intelligence, wherein calculating the parameters using artificial intelligence may include minimizing unused power reserves of movement of moving components of the packaging or palletizing machine. The parameters for configuring the packaging or palletizing machine may include acceleration data, position data, sequences, and/or axis torques of at least one layer forming robot in the packaging or palletizing machine.

In the case where the calculation of the parameters is performed on a server, in step S440 the parameters are received in a data set from the server before in step S450 the packaging or palletizing machine is configured based on the received data set.

Figure 5:
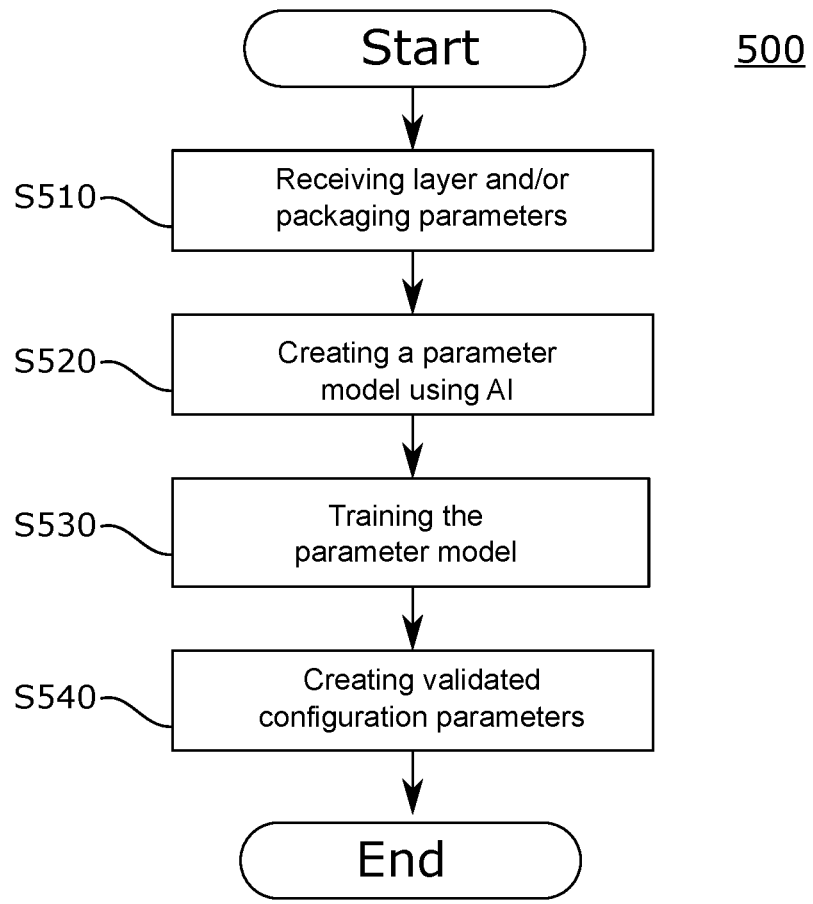
FIG. 5: an example of a method according to the invention for the automated generation of motion and position parameters of a packaging or palletizing machine for bundle arrangements by means of an AI module.

FIG. 5 illustrates a method 500 for calculating configuration parameters for the packaging or palletizing machine, as preferably performed by the AI module 110.

First, in step S510, the AI module 310 receives the input data, which consists of, for example, layer and/or packaging parameters.

In step S520, the AI module 310 creates the configuration parameters, or a parameter model, from the input data, which are used to configure the packaging or palletizing machine and/or the corresponding modules of the packaging or palletizing machine. This step S520 may be performed, for example, by the steps and modules as described in connection with FIG. 3. The parameterization model may include, for example, model parameters of the packaging or palletizing machine simulated by the digital twin, as described above.

In step S530, the parameterization model is trained. For example, the parameterization model can be trained using the AI module 310 based on the parameter data sets of configured packaging or palletizing machine. Thus, the configuration parameters are derived from the trained parameterization model.

Finally, in step S540, the validated configuration parameters are created, which can then be transferred to the packaging or palletizing machine control module for further use.

Figure 6:
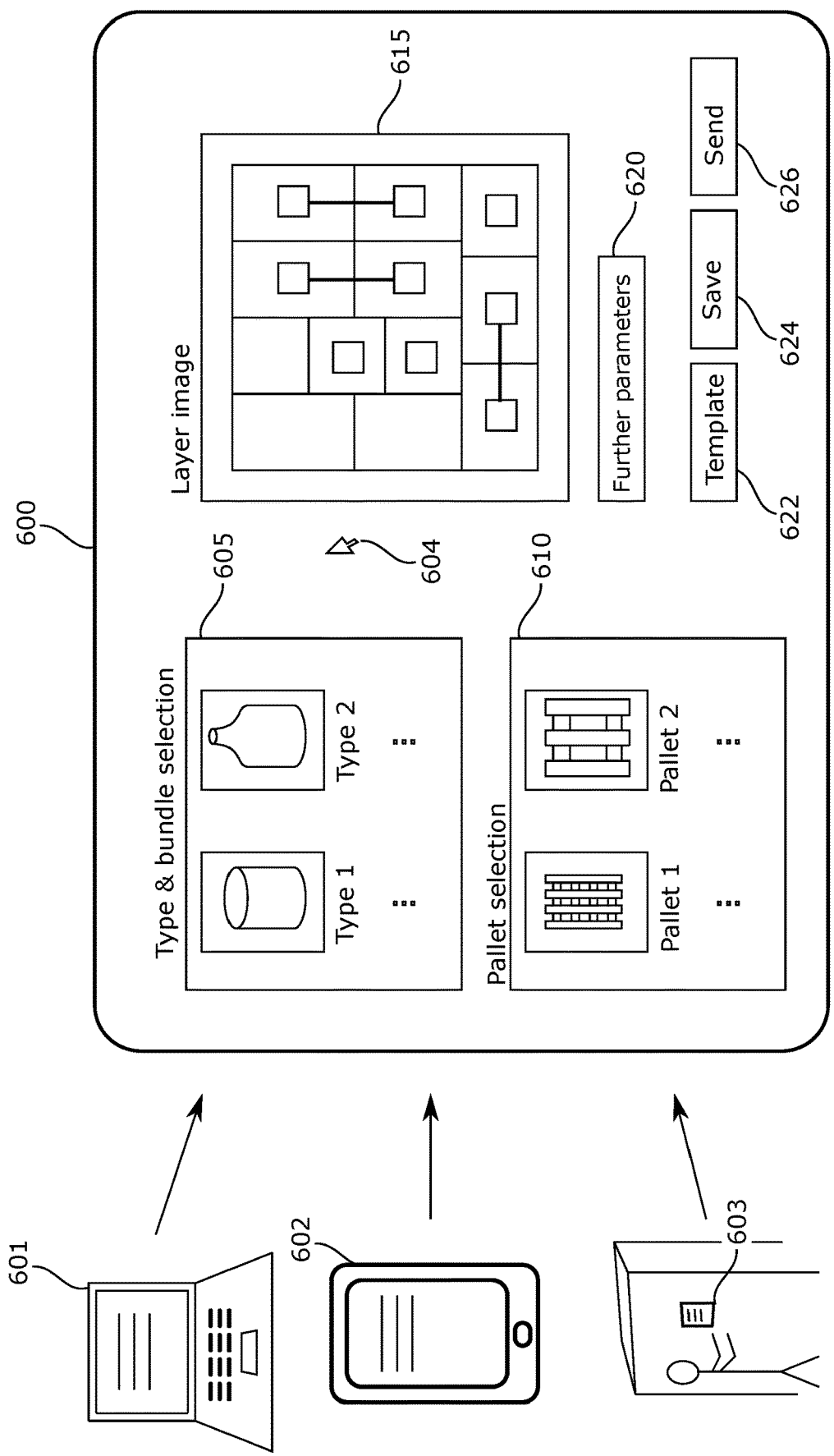
FIG. 6: an embodiment example according to the invention of a user interface for entering user inputs.

FIG. 6 shows an exemplary user interface 600, by means of which the various inputs regarding layer and/or packaging parameters or other parameters may be made by a user. The user interface may be accessed and operated by a computer 601, a smartphone or tablet computer 602, or a human-machine interface (HMI) 603. For example, the HMI 603 may be integrated into the packaging or palletizing machine and may provide further functions in addition to the user interface 600 for entering the above parameters, such as manual adjustment or control of the packaging or palletizing machine. Other ways of accessing the user interface 600 are also conceivable and not excluded.

The user interface can be used to enter and select various parameters, such as a variety and pack selection 605, a pallet selection 610, the creation of a layer layout 615, and/or further parameters 620. Depending on how the user interface 600 is accessed, the user interface can have touch or gesture recognition, voice recognition, or input capability using a mouse and keyboard with a cursor 604.

The intuitively simple operation of the user interface 600 allows even technically untrained operators to create an appropriate palletizing layout or layer image 615, for example, by "dragging and dropping" from the operator panels 605 and 610 into the operator panel 615. When the layer image is completed, it can be saved using the key 624 or sent using the key 626. In the latter case, the user input, together with optionally further parameters, is sent to the AI module 310, where the calculation of the optimized operating parameters for the packaging or palletizing machine is performed.

It is also possible to use the 622 key to load already stored layouts or layer patterns from a template archive, which in particular enables fast switching between different palletizing operations of different bundles.

The user interface can also be used to enter new grades into the system, or to define new pallet types.

The invention claimed is:

1. A method for automated generation of motion and position parameters of a machine for bundle arrangements, the machine being a packaging machine or a palletizing machine, the method comprising:
    receiving, at a user interface, at least one of layer parameters and packaging parameters;
    transmitting the layer parameters or the packaging parameters to a server;
    generating, on the server, parameters for controlling the machine, wherein the parameters are generated such that the packaging machine being controlled using the parameters creates a package for a bundle according to at least one of the packaging parameters and the layer parameters, or the palletizing machine being controlled using the parameters arranges bundles according to at least one of the layer parameters and the packaging parameters, wherein:
        generating the parameters comprises calculating the parameters using a digital twin of the machine or using artificial intelligence, wherein calculating the parameters comprises minimizing unused power reserves of the movement of moving components of the machine, and
        the unused power reserves are implemented based on operating limits of the machine that are not utilized during normal operation;
    receiving a data set from the server, wherein the data set includes the generated parameters for controlling the machine; and
    configuring the machine based on the received data set.

2. The method of claim 1, wherein the layer parameters and the packaging parameters comprise at least one of: a pallet type, a pallet size, a packing scheme, a layer pattern, an arrangement of bundles on a pallet, a packing item description, a bundle size, a storage scheme, and a tray or box size.

3. The method of claim 1, further comprising:
    checking the received data set for completeness or integrity before using the parameters of the data set to configure the machine.

4. The method of claim 1, wherein the parameters in the received data set comprise at least one of: acceleration data, position data, sequences and axis moments of at least one layer forming robot in the machine.

5. The method of claim 1, further comprising:
    querying hardware parameters of the machine, wherein the hardware parameters comprise a machine feature or one or more set-up parts; and
    querying bills of materials with respect to bundles.

6. The method of claim 1, wherein the artificial intelligence calculates the parameters and validates the calculated parameters for feasibility using the digital twin of the machine.

7. A machine for bundle arrangements, the machine being a packaging machine or a palletizing machine, the machine comprising:
   a user interface configured to receive at least one of layer parameters and packaging parameters;
   a communication module configured to transmit the layer parameters and the packaging parameters to a server and to receive a data set from the server, wherein the data set comprises generated parameters for controlling the machine, wherein the parameters are calculated in particular using a digital twin of the machine, wherein the parameters are generated such that the packaging machine being controlled using the parameters creates a package for a bundle according to at least one of the packaging parameters and the layer parameters, or the palletizing machine being controlled using the parameters arranges bundles according to at least one of the packaging parameters and the layer parameters, and wherein:
      generating the parameters comprises calculating the parameters using a digital twin of the machine or using artificial intelligence, wherein calculating the parameters comprises minimizing unused power reserves of the movement of moving components of the machine, and
      the unused power reserves are implemented based on operating limits of the machine that are not utilized during normal operation; and
   a control module configured to configure the machine based on the received data set.

8. The machine of claim 7, wherein the layer parameters and the packaging parameters include at least one of: a pallet type, a pallet size, a packing scheme, a layer pattern, an arrangement of bundles on a pallet, a packaged article description, a bundle size, a storage scheme, and a tray or box size.

9. The machine of claim 7, wherein the control module is further configured for at least one of: checking the received data set for completeness, and checking integrity before using the parameters of the data set for configuring the machine.

10. The machine of claim 7, wherein the parameters in the received data set comprise at least one of: acceleration data, position data, sequences, and axis moments of at least one layer forming robot in the machine.

11. The machine of claim 7, wherein the user interface is further configured to:
   query hardware parameters of the machine, wherein the hardware parameters comprise a machine feature or one or more setup parts; and
   query bills of materials with respect to bundles.

12. The machine of claim 7, wherein the artificial intelligence calculates the parameters and validates the calculated parameters for feasibility using the digital twin of the machine.

13. A system for automated generation of motion and position parameters of a machine for bundle arrangements, the machine being a packaging machine or a palletizing machine, wherein the system comprises:
   the machine for bundle arrangements, comprising:
      a user interface configured to receive at least one of layer parameters and packaging parameters,
      a communication module configured to transmit the layer parameters and the packaging parameters to a server and to receive a data set from the server, wherein the data set comprises generated parameters for controlling the machine, and
      a control module configured to configure the machine based on the received data set,
   wherein the unused power reserves are implemented based on operating limits of the machine that are not utilized during normal operation, and
   the server configured to:
      receive at least one of the layer parameters and packaging parameters from the machine,
      generate the parameters, particularly using a digital twin of the machine, wherein the parameters are generated in such a way that the packaging machine being controlled using the parameters creates a package for a bundle according to at least one of the packaging parameters and layer parameters, or the palletizing machine being controlled using the parameters arranges bundles according to at least one of the layer parameters and packaging parameters, wherein generating the parameters comprises calculating the parameters using a digital twin of the machine or using artificial intelligence, and wherein calculating the parameters comprises minimizing unused power reserves of the movement of moving components of the machine, and
      transmit the generated parameters to the machine.

* * * * *